No. 613,709. Patented Nov. 8, 1898.
W. H. ORR.
CALKED HORSESHOE PLATE.
(Application filed Mar. 7, 1898.)
(No Model.)
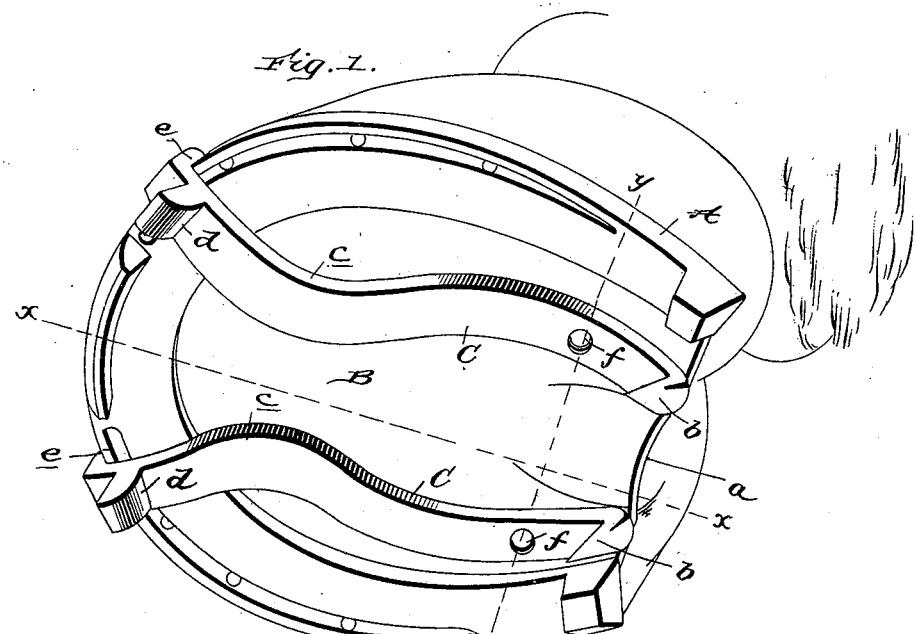
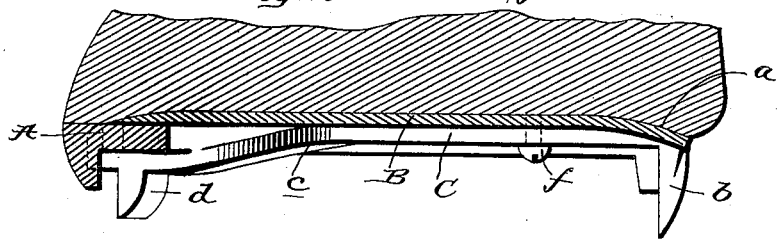
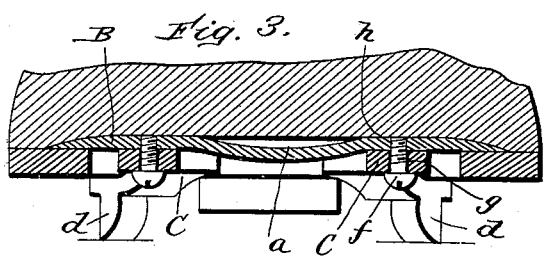   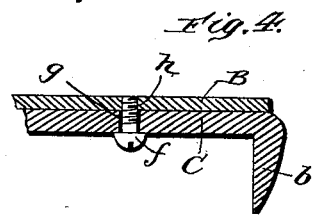
Witnesses:
Inventor
W. H. Orr
By James Sheehy
Attorney
THE NORRIS PETERS CO., PHOTO-LITHO., WASHINGTON, D. C.

UNITED STATES PATENT OFFICE.

WILLIAM H. ORR, OF BEAUSEJOUR, CANADA.

CALKED HORSESHOE-PLATE.

SPECIFICATION forming part of Letters Patent No. 613,709, dated November 8, 1898.

Application filed March 7, 1898. Serial No. 672,908. (No model.)

*To all whom it may concern:*

Be it known that I, WILLIAM H. ORR, a citizen of the Dominion of Canada, residing at Beausejour, in the Province of Manitoba and Dominion of Canada, have invented new and useful Improvements in Horseshoes, of which the following is a specification.

My invention relates to horseshoes, more particularly to attachments therefor; and it contemplates the provision of an attachment by which calks may be readily connected to or disconnected from a shoe without the necessity of removing the same from the horse's hoof and one which is adapted to serve the additional function of a guard for preventing ice, stones, tree-stumps, and the like from injuring the frog or any other part of the horse's foot.

With the foregoing ends in view the invention will be fully understood from the following description and claim when taken in conjunction with the annexed drawings, in which—

Figure 1 is a perspective view illustrating my improved attachment in its operative position. Figs. 2 and 3 are sections taken in the planes indicated by the lines $x\ x$ and $y\ y$, respectively, of Fig. 1; and Fig. 4 is a detail section illustrating the manner in which the calk-bars are connected with the body or guard plate.

In the said drawings similar letters designate corresponding parts in all of the several views, referring to which—

A designates an ordinary horseshoe designed to be connected to a horse's hoof in the usual well-known manner, and B designates the body or guard plate of my improved attachment, which conforms in shape to the bottom of a horse's hoof and is made of metal and thin, as shown, so as not to be unduly heavy. This plate B has its edge beveled or made thin after the manner shown in Figs. 2 and 3, so as to permit of it being readily driven between a horse's hoof and the shoe thereon from the rear, and it is also provided at its rear end with a depressed or concave portion $a$, the purpose of which is to receive the frog of the horse's foot and prevent undue compression thereof. When interposed between a hoof and shoe in the manner just stated, the plate B will prevent snow from balling under the horse's foot and will also effectually prevent injury to the frog or any other part of the foot in the event of the horse stepping on a sharp stone, sapling-stump, or the like, which is an important advantage. The plate B also serves for the connection of calk-bars C. (Better shown in Figs. 1 and 2.) These bars C have heel-calks $b$ at their rear ends, and they also have their forward portions bent downwardly and laterally outward, as indicated by $c$, and provided with toe-calks $d$ and upwardly-extending end portions $e$. The connection between said calk-bars and the plate B is preferably effected by screws $f$, which take loosely through apertures $g$ in the calk-bars and into threaded apertures $h$ in the plate. I desire it understood, however, that the connection may be effected in any other manner that will permit of the calk-bars swinging laterally.

When it is desired to place my improved attachment upon a shoe, the front portions of the calk-bars C are swung outwardly and the body-plate B is gently driven into position between the shoe and horse's foot from the rear. The downward and lateral deflection of the forward portions of the calk-bars at $c$ enables their end portions $e$ in the position stated to ride over the shoe, and when the plate B is driven home they are forced inwardly by a suitable tool, so as to cause the said upturned end portions $e$ to catch tightly against and hug the forward edge of the shoe at either side of the calk thereof, and by preventing rearward movement of the plate B assist in holding the attachment on the shoe. As the end portions $e$ are forced inwardly after they first engage the forward edge of the shoe they catch more tightly against said edge, and in consequence there is little liability of their casually working loose.

When the attachment is to be removed from the shoe for any purpose, the forward ends of the calk-bars are forced down and outwardly by a suitable tool until their upturned end portions $e$ are disengaged from the shoe, and the plate B is then forced rearwardly from between the hoof and shoe. From this it follows that a horse may be quickly "roughed" in the event of sleet or snow and that the attachments may be as readily removed when there is no occasion for their use, and this without the employment of skilled labor or tools other than a hammer or similar implement.

In addition to the purposes stated my improved attachment enables lame and tender footed animals to travel perfectly sound, this being due to the fact that the plate B protects the entire under side of the foot from injury.

The calk-bars may either rest in line with each other or be crossed at any point desired in rear of the toe of the shoe, as desired. It is also obvious that the thickness of the plate B may be increased at the points where the connecting-screws take into it, if desirable.

Having thus described my invention, what I claim is—

The herein-described attachment for horseshoes, comprising the metallic guard or body plate adapted to be interposed between a shoe and a horse's hoof and being of a shape and size to occupy the space within the shoe, and the bars pivotally connected to said plate and carrying calks and having the upwardly-directed portions e at their forward ends adapted to hug the forward edge of a shoe, substantially as and for the purpose set forth.

In testimony whereof I have hereunto set my hand in presence of two subscribing witnesses.

WILLIAM H. ORR.

Witnesses:
W. C. McDONALD,
Hz. A. JETISON.